United States Patent [19]
Hablani

[11] Patent Number: 5,257,802
[45] Date of Patent: Nov. 2, 1993

[54] ZERO-RESIDUAL-ENERGY MINIMUM-TIME SLEW OF A FLEXIBLE SPACE STRUCTURE WITH DAMPING

[75] Inventor: Hari B. Hablani, Westminster, Calif.

[73] Assignee: The United States of America as represented by the Secretary of the Air Force, Washington, D.C.

[21] Appl. No.: 904,241

[22] Filed: Jun. 25, 1992

[51] Int. Cl.$^5$ ............................................... B64G 1/24
[52] U.S. Cl. ................................... 244/164; 244/169
[58] Field of Search ............... 244/164, 165, 166, 169, 244/170; 364/459, 434

[56] References Cited

U.S. PATENT DOCUMENTS

| | | | |
|---|---|---|---|
| 4,306,692 | 12/1981 | Kaplan et al. | 244/165 |
| 4,567,564 | 1/1986 | Bittner et al. | 364/434 |
| 4,687,161 | 8/1987 | Plescia et al. | 244/171 |
| 4,892,273 | 1/1990 | Fedor | 244/158 R |

OTHER PUBLICATIONS

J. Junkins et al., "Near-Minimum-Time Maneuvers of Flexible Vehicles: A Liapunov Control Law Design Method", AIAA-90-1222, AIAA Dynamics Specialist Conference, Long Beach, Calif., Apr. 5-6, 1990, pp. 299-310.
Velde, Wallace E. et al., "Design of Space Structure Control Systems Using On-Off Thrusters", J. Guidance, vol. 6, No. 1, Jan.-Feb. 1983, pp. 53-60.
Singh, G. et al., "Planar, Time-Optimal, Rest-to-Rest Slewing Maneuvers of Flexible Spacecraft", J. Guidance, vol. 12, No. 1, Jan.-Feb. 1989, pp. 71-81.
de Oliveira e Souza, Marcelo Lopes, "Exactly Solving the Weighted Time/Fuel Optimal Control of an Undamped Harmonic Oscillator", J. Guidance, vol. 11, No. 6, pp. 488-494.
Rajan, N., "Minimum Time Slewing of the SIRTF Spacecraft", 87-2527, Sterling Software, Palo Alto, Calif., pp. 1222-1228.
Byers, R. M. et al., "Near-Minimum Time, Closed-Loop Slewing of Flexible Spacecraft", J. Guidance, vol. 13, No. 1, Jan.-Feb. 1990, pp. 57-64.
Juang, Jer-Nan, et al., "A Slewing Control Experiment for Flexible Structures", J. Guidance, vol. 9, No. 5, Sep.-Oct. 1986, pp. 599-607.
Breakwell, John A., "Optimal Feedback Slewing of Flexible Spacecraft", J. Guidance and Control, AIAA 81-4239, vol. 4, No. 5, Sep.-Oct. 1981, pp. 472-479.
Namera, Eur. Pat. Appl. (Publ.) 0251692, Jan. 1988.

*Primary Examiner*—Galen Barefoot
*Attorney, Agent, or Firm*—Irwin P. Garfinkle; Donald J. Singer

[57] ABSTRACT

A method is disclosed wherein a flexible space craft may be slewed by the application of positive and negative acceleration forces applied about a slewing axis. The method is such that at the end of the application of the slewing forces there is no residual energy in the excited modes. By examination of the response of an undamped and then damped structural mode to a sequence of step forces—entirely within the premises of structural dynamics discipline—a minimum-time zero-residual-energy torque profile with unequal intervening pulses is arrived at heuristically. Rigorous yet simple relationships are then established among the maneuver angle of a rest-to-rest slew, slew time, widths of the intervening pulses, and natural frequency and damping of a critical mode whose energy at the end of slew must be zero.

3 Claims, 9 Drawing Sheets

A GENERIC DEFORMABLE SPACECRAFT TO BE SLEWED ABOUT X-AXIS

BANG-BANG TORQUE PROFILE WITH ONE FREE PARAMETER FOR
ZERO RESIDUAL ENERGY IN ONE UNDAMPED FLEXIBLE MODE

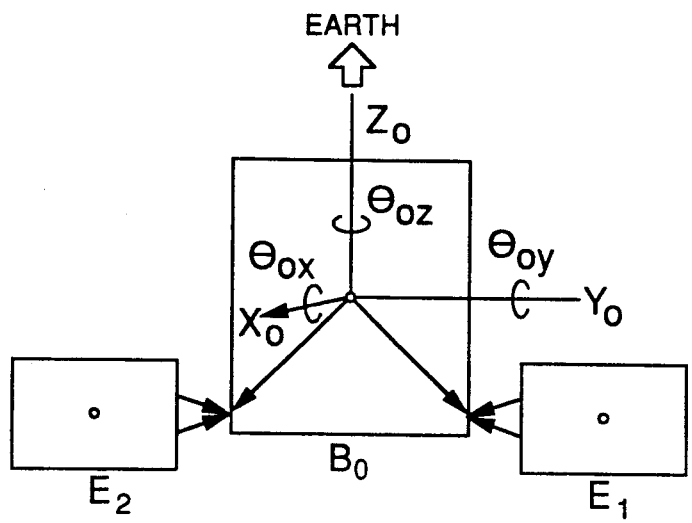

A GENERIC DEFORMABLE SPACECRAFT TO BE SLEWED ABOUT X-AXIS

FIG. 3

| MODE NO ($\mu$) | FREQUENCY (Hz) $f_\mu$ | DEFORMATIONAL PATTERN OF SOLAR ARRAYS | INTERACTING ATTITUDE DEGREE OF FREEDOM $\theta_\alpha$ |
|---|---|---|---|
| 1 | 0.281 | FIRST SYMMETRIC TRANSVERSE BENDING | $\theta_y$ |
| 2 | 0.403 | ANTISYMMETRIC TRANSVERSE BENDING | $\theta_z$ |
| 3 | 0.842 | IN-PLANE SYMMETRIC BENDING | . |
| 4 | 0.971 | IN-PLANE ANTISYMMETRIC BENDING | $\theta_x$ |
| 5 | 1.536 | SECOND SYMMETRIC TRANSVERSE BENDING | $\theta_y$ |

TABLE 1: FIRST FIVE VEHICLE MODES OF THE SPACECRAFT IN FIG. 3

FIG. 3A

TWO INTERVENING PULSE-WIDTHS AND SLEW TIME $t_f$ AGAINST DAMPING COEFFICIENT $\zeta_\mu$ TWO INTERVENING PULSE-WIDTHS (SECONDS) AGAINST DAMPING COEFFICIENTS $\zeta_\mu$ MODAL COORDINATE $\eta_\mu$ AND ITS RATE $\dot{\eta}_\mu$ WITH NO STRUCTURAL DAMPING ($\zeta_\mu=0$), EXCITED BY THE ZERO-RESIDUAL-ENERGY TORQUE PROFILE ALSO BASED ON $\zeta_\mu=0$ MODAL COORDINATE $\eta_\mu$ AND ITS RATE $\dot{\eta}_\mu$ WHEN $\zeta_\mu = 0.0025$ BUT THE ZERO-RESIDUAL-ENERGY TORQUE PROFILE IS BASED ON $\zeta_\mu = 0$ MODAL COORDINATE $\eta_\mu$ AND ITS RATE $\dot\eta_\mu$ WHEN $\zeta_\mu$ =0.0025 AND THE ZERO-RESIDUAL-ENERGY TORQUE PROFILE IS BASED ON $\zeta_\mu$ =0

MODAL COORDINATE $\eta_\mu$ AND ITS RATE $\dot{\eta}_\mu$ WHEN $\zeta_\mu$ =0.0025 AND THE TORQUE PROFILE IS THE CONVENTIONAL BANG-BANG FOR RIGID SPACECRAFT TOTAL RATE $\dot{\Theta}$ AND SLEW ANGLE $\Theta$ VERSUS TIME t TABLE 2. MODAL AMPLITUDE OF RESIDUAL OSCILLATIONS
($t \geq t_f$) UNDER FOUR DIFFERENT CIRCUMSTANCES

| SPACECRAFT STRUCTURE DAMPING COEFFICIENT $\zeta_\mu$ | THE $\zeta_\mu$ FOR WHICH THE WIDTHS OF THE INTERVENING PULSES ARE CALCULATED | RESIDUAL MODAL ($\eta_\mu$) AMPLITUDE AT $t = t_f$ |
|---|---|---|
| 0.0 | 0.0 | 0.0004 |
| 0.0025 | 0.0 | 0.0044 |
| 0.0025 | 0.0025 | 0.00025 |
| 0.0025 | NO INTERVENING PULSES; RIGID, BANG-BANG TORQUE PROFILE | 0.0135 |

FIG. 11

ZERO-RESIDUAL-ENERGY MINIMUM-TIME SLEW OF A FLEXIBLE SPACE STRUCTURE WITH DAMPING

STATEMENT OF GOVERNMENT INTEREST

The invention described herein may be manufactured and used by or for the Government for governmental purposes without the payment of any royalty thereon.

BACKGROUND OF THE INVENTION

This invention departs from the conventional way of solving the problem of zero-residual-energy minimum-time slew of a flexible space structure with damping using Modern Optimal Control tools. Instead of the prior art techniques presently in use, a minimum time, zero-residual-energy torque profile with unequal intervening pulses is arrived at heuristically. This is accomplished by a close examination of the response of an undamped and then damped structural mode to a sequence of step forces—entirely within the premises of structural dynamics discipline. Rigorous yet simple relationships are then established among the maneuver angle of a rest-to-rest slew, slew time, widths of the intervening pulses, and natural frequency and damping of a critical mode whose energy at the end of slew must be zero. Numerical results, illustrating the theory, demonstrate that a flexible space structure with small natural damping can be slewed with on-off thrusters such that a critical elastic mode has zero energy as the slew ends.

Over the last decade, significant strides have been made in the area of slewing flexible spacecraft. Several researchers have considered closed-loop linear optimal controllers with continuous torque profiles, with the objective of minimizing energy in a flexible mode at the end of slew. (See (1) Byers et al, Near Minimum Time, Closed-Loop Slewing Of Flexible Spacecraft, AIAA Journal of Guidance, Control, and Dynamic, Vol. 13, No. 1, January–February 1990, pp. 57–65, (2) Juang et al, A Slewing control Experiment for Flexible Structure, Journal of Guidance, Control, and Dynamics, Volume 9, September–October 1986, pp. 599–607, (3) Breakwell, Optimal Feedback Slewing of Flexible Spacecraft, Journal of Guidance and Control, Vol. 4, September–October 1981, pp. 472–479 and (4) Turner and Chun, Optimal Distributed Control of a Flexible Spacecraft During a Large Angle Maneuver", Journal of Guidance, Control and Dynamics, Vol. 7, May–June, 1984, pp. 157–264.) Meanwhile, other investigators have examined open-loop time-optimal, or nearly so, torque profiles to achieve the same objective. Two endeavors in this category are disclosed in papers by Singh et al, (See Planar, Time-Optimal Rest-to-Rest Slewing Maneuvers of Flexible Spacecraft, Journal of Guidance, Control and Dynamics, Vol. 12, No. 1, January–February, 1989, pp. 71–81), and Thompson et al, (See Near-Minimum-Time Open-Loop Slewing of Flexible Vehicles, Journal of Guidance, Control and Dynamics, Vol. 12, No. 1, January–February, 1989, pp. 82–88)

From the foregoing, and from other articles referenced therein, it has been observed that most investigators have formulated the problem within the framework of controls discipline: first-order state space model, application of Pontryagin's maximum principle, formation of Hamiltonian, Lagrange multipliers, costate vectors, and so forth. While this is a powerful approach and it yields elegant solutions, it overlooks the simple response of a second order structural mode to a bang-bang torque profile, and none of the prior investigators have proposed a zero-residual-energy minimum-time torque profile for slewing a flexible space structure with its small inherent damping.

A study of the response of an undamped structural mode excited by a sequence of step torques, reported below, shows a torque profile with compensating pulses such that it fulfills two requirements at once: (1) it slews a free space structure by a desired angle, and (2) it zeroes the energy in a critical flexible mode a the end of the slew. In addition, the relationships among the widths of intervening pulses, slew time, maneuver angle, critical modal frequency and structural damping are established and the numerical results illustrating the theory are also disclosed.

RESPONSE OF AN UNDAMPED MODE TO A SEQUENCE OF STEP FORCES

To determine the response of an undamped mode to a squence of step forces in the context of flexible spacecraft attitude dynamics, the first question which must be confronted is whether to model dynamics using appendage modes or vehicle modes. Both approaches have been used in the past; for example, Turner and Chun, and Singh et al used appendage modes while Breakwell and Vander Velde and He (See "Design of Space Structure Control Systems Using On-Off Thrusters", Journal of Guidance, Control, and Dynamics, Vol. 6, No. 1, January–February 1983) employed vehicle modes. It is natural to think of using appendage modes because flexibility of traditional spacecraft arose from appendages, and because engineers are exposed to assumed modes or appendage modes first and then to vehicle modes. But when appendage modes are used, the spacecraft bus attitude and modal coordinates are coupled through appendage modal momentum coefficients (See Hughes, "Modal Identities for Elastic Bodies with Application to Vehicle Dynamics and Control, Transactions of ASME, Journal of Applied Mechanics, Vol. 47, March 1980, pp. 177–184.) and this coupling encumbers the analysis. Indeed, precisely because of that, Skaar et al had to resort to a complicated analysis to minimize residual modal energy, that is, the energy in a mode after slew. (See "On-Off Attitude control of Flexible Satellites, Journal of Guidance, Control, and Dynamics, Vol. 9, No. 4, July–August 1986, pp. 507–510.) To do away with this coupling and the ensuing mathematical complications, this invention models spacecraft dynamics in vehicle modes ab initio. For simplicity, this application will consider a single-axis slew problem. To write equations governing this maneuver with thrusters, we introduce the notations:

I = principal, central moment of inertia of the vehicle about the slew-axis;
$T_{mx}$ = maximum torque about the same slew-axis;
$\theta(t)$ = rigid mode attitude of the spacecraft;
$\eta_\mu(t)$—modal coordinate for $\mu$-th vehicle elastic mode having frequency $\omega_\mu$; and
$\chi_\mu(\mu=1,2,\ldots)$ = translational modal coefficient at the jet location for the $\mu$-th mode.

We take that the slew torque is produced by a pair of jets located symmetrically around the mass center of the vehicle, each jet exerting a constant thrust force $F_{mx}$ in order to produce the torque $T_{mx}$ or $-T_{mx}$. When the torque switches from $T_{mx}$ to $-T_{mx}$, the jets switch also, and although the direction of the thrust force $F_{mx}$ may or may not change depending on the thruster locations and slew axis, the product $\chi_{\mu j} F_{mx}$ for antisymmetric modes will change its sign. The excitation of symmetric modes in not important here because usually they do not contribute to the spacecraft attitude; if they do because of moment arm however, the thrust $F_{mx}$ then change its sign while the modal coefficient $\chi_{\mu j}$ will not, so the product $\chi_{\mu j} F_{mx}$ still changes its sign as before for antisymmetric modes.

With these preliminaries, the single-axis slew dynamics of a deformable spacecraft with thruster, in vehicle modes, is governed by Equation 26 appearing in Hablini, "Modal Identities for Multibody Elastic Spacecraft—An Aid to selecting Modes for Simulation". AIAA 89—0544, 27th Aerospace Sciences Meeting, January 1989, Reno, Nev.

$$I\ddot{\theta} = \begin{cases} T_{mx} & 0 \leq t \leq t_f/2 \\ -T_{mx} & t_f/2 \leq t \leq t_f \\ 0 & t_f \leq t \end{cases} \quad (1a)$$

$$\ddot{\eta}_\mu + 2\zeta_\mu \omega_\mu \dot{\eta}_\mu + \omega_\mu^2 \eta_\mu = \quad (1b)$$

$$\begin{cases} \chi_{\mu J} F_{mx} & 0 \leq t \leq t_f/2 \\ -\chi_{\mu J} F_{mx} & t_f/2 \leq t \leq t_f (\mu = 1,2,\ldots) \\ 0 & t_f \leq t \end{cases}$$

where $t_f$=slew duration, $\zeta_\mu$=equivalent viscous damping coefficient of $\mu$-th mode, and $(')=d(\ )/dt$. In this section, $\zeta_\mu$ will be taken to be zero. Total spacecraft attitude (t) is given by $$\theta(t) = \theta(t) - \sum_{\mu=1}^{\infty} \phi_\mu \eta_\mu(t) \quad (1c)$$

where $\phi_\mu$ is the $\mu$-th mode slope at the spacecraft bus location. The slew angle of a spacecraft is specified in terms of $\theta(t)$, not $\theta(t)$; nevertheless, inasmuch as our objective is to minimize the residual energy of modes, that is, to render $\eta_\mu(t_f)=\theta=\dot{\eta}_\mu(t_f)$ ($\mu=1,2,\ldots$), it is appropriate to specify the slew in terms of $\theta(t_f)$ and $\dot{\theta}(t_f)$ instead. From Eq. (1a), we can find easily that for a rest-to-rest slew maneuver from initial angle $\theta_i \quad \theta(o)$ to the final angle $\theta_f \triangleq \theta(t_f)$, the slew time $t_f$ with a bang-bang torque profile is given by $$t_f/2 = [(\theta_f - \theta_i)I/T_{mx})]^{\frac{1}{2}} \quad (2)$$

where, when $(\theta_f - \theta_i) < 0$ relative to some reference attitude, $T_{mx} < 0$ also in order to keep $t_f$ real and greater than zero.

To probe the mechanics of excitation of an elastic mode as the slew torque $T(t)$ traces its bang-bang profile, we ignore the damping coefficient and solve Eq. (1b) for $0 < t < t/2$ with the initial conditions $\eta_\mu(0) = 0 = \dot{\eta}_\mu(0)$, and obtain the well-known relationships [See Timoshenko et al, Vibration Problems in Engineering, John Wiley and Sons, New York, 1974]

$$\eta_\mu(t) = \eta_{\mu s}(1-\cos \omega_\mu t), \dot{\eta}_\mu(t) = \omega_\mu \eta_{\mu s} \sin \chi_\mu t \\ 0 \leq t < t_f/2 \quad (3)$$

where the static deformation $\eta_{\mu s}$ is defined as $$\eta_{\mu s} = \chi_{\mu j} F_{mx}/\omega_\mu^2 \quad (4)$$

For the purposes of the following discussion, $\eta_{\mu s} > 0$ is assumed, although if $\eta_{\mu s} < 0$, the discussion can be modified readily. From Eq. (3), the range of $\eta_\mu(t)$ and $\dot{\eta}_\mu(t)$ are: $0 < \eta_\mu(t)$ are: $0 < \eta_\mu(t) \leq 2\eta_{\mu s}$, and $-\omega_\mu \eta_{\mu s} \leq \dot{\eta}_\mu(t) \leq \omega_\mu \eta_{\mu s}$. When $t = \eta \tau_\mu (\tau_\mu = 2\pi/\omega_\mu$, the period of the mode $\mu$, and $n=1,2,3,\ldots$), both $\eta_\mu$ and $\dot{\eta}_\mu$ will be zero; that is, the energy of the mode will be zero. Therefore, if the step torque $T_{mx}$ and the concomitant step force $F_{mx}$ cease to apply just after $t = n\tau_\mu$, the mode $\mu$(only one mode, not all) will also cease to vibrate because it has no energy at $t = n\tau_\mu$.

On the other hand, if the torque $T_{mx}$ switches to $-T_{mx}$ at $t = n\tau_\mu = t_f/2$, and simultaneously the product $\chi_{\mu s} F_{mx}$ switches to $-\chi_{\mu s} F_{mx}$, then the mode will begin to vibrate as $$\eta_\mu(t) = \eta_{\mu s}(1-\cos \omega_\mu t), \dot{\eta}_\mu(t) = \omega_\mu \eta_{\mu s} \sin \omega_\mu t \\ t \geq \eta t_\mu = t_f/2 \quad (5)$$

Comparing Esq. (5) with Eqs. (3), we deduce that under these especial circumstances, $\eta_\mu(t)$ is antisymmetric and $\dot{\eta}_\mu(t)$ symmetric with respect to the vertical line $t = n\tau_\mu$. And once again, if $-T_{mx}$ ceases to apply from $t = (n+m)\tau_\mu$ onwards, where m is another integer not necessarily different from n, the mode $\mu$ (only one mode, not all, as before) will cease to oscillate, as desired.

Alongside the above zero residual energy aspect, there exists worst residual energy aspect also. From Eqs. (3) we gather that if $T_{mx}$ is terminated at $t = (n-\frac{1}{2})\tau_\mu$, the terminal conditions of the mode will then be: $\eta_{\mu 2} = 2\eta_{\mu s}$ and $\dot{\eta}_\mu = 0$, and because of this stored energy $E \triangleq \frac{1}{2}\omega_\mu(2\eta_{\mu s})^2$ the mode will oscillate with an amplitude of $2\eta_{\mu s}$ and zero average. On the other hand, if, instead of terminating at $t = (\eta-\frac{1}{2})\tau_\mu$, $T_{mx}$ switches to $-T_{mx}$ and the product $\chi_{\mu s} F_{mx}$ to $-\chi_{\mu s} F_{mx}$, the static deformation will also switch from $\eta_{\mu s}$ to $-\eta_{\mu s}$, and from this new static state the modal coordinate at just that instant will be $2\eta_{\mu s} - (-\eta_{\mu s}) = 3\eta_{\mu s}$ above. Therefore, the new trough of $\eta_\mu$, which will occur after $\tau_\mu/2$ seconds later, will be at $-\eta_{\mu s} - 3\eta_{\mu s} = -4\eta_{\mu s}$. Thus, after $t \geq (n-\frac{1}{2})\tau_\mu$, the undamped $\eta_\mu$ will oscillate between $2\eta_{\mu s}$ and $-4\eta_{\mu s}$, with the average $-\eta_{\mu s}$. Mathematically, under these circumstances, $$\eta_\mu(t) = -\eta_{\mu s}(1-3 \cos \omega_\mu t), \dot{\eta}_\mu(t) = 3\eta_{\mu s}\omega_\mu \sin \omega_\mu t \\ t \geq (n-\frac{1}{2})\tau_\mu = t_f/2 \quad (6)$$

Compare the above range of $\eta_\mu(t)$ [Eq. (6)] with the range $-2\eta_{\mu s} \leq \eta_\mu < 0$, whose average is also $-\eta_{\mu s}$, obtained earlier by switching at $t = \eta \tau_\mu$ [Eq. (5)]. The modal oscillations will worsen yet if the torque $-T_{mx}$ is now terminated $(m-\frac{1}{2})\tau_\mu$ seconds later, that is, at $t = (n+m-1)\tau_\mu$, because at that instant the modal coordinate will be at its trough $\eta_\mu(t) = -4\eta_{\mu s}$ and $\dot{\eta}_\mu(t) = 0$ [verify with Eq. (6)], and thereafter it will oscillate with $4\eta_{\mu s}$ amplitude and zero average. On the other hand, the residual oscillations will be smaller than $4\eta_{\mu s}$ if $-T_{mx}$ is terminated $m\tau_\mu$ seconds later, that is, at $t = (n+m-\frac{1}{2})\tau_\mu$, because at that instant $\eta_\mu(t) = 2\eta_{\mu s}$ and $\dot{\eta}_\mu(t) = 0$, so the mode will oscillate with $2\eta_{\mu s}$ amplitude and zero average. This happens because the work done by the force $-F_{mx}$ during the period $m\tau_\mu$(recall m is an integer) is zero, so at the termination of $-F_{mx}$ at $t = (n+m-\frac{1}{2})\tau_\mu$ the energy in the mode is what it started with at $t = (n-\frac{1}{2})\tau_\mu$.

To elucidate the above discussion further, we examine the energy $E_\mu$ of the -th mode:

$$E_\mu = (\dot{\eta}_\mu^2 - \omega_\mu^2 \eta_\mu^2)/2 \qquad (7)$$

Taking its derivative and utilizing Eq. (1b) ($\zeta_\mu$ still zero) we obtain $$\dot{E}_\mu = \begin{cases} \dot{\eta}_\mu \chi_{\mu J} F_{mx} & 0 \leq t \leq t_f/2 \quad (8a) \\ -\dot{\eta}_\mu \chi_{\mu J} F_{mx} & t_f/2 \leq t \leq t_f \quad (8b) \\ 0 & t_f \leq \quad (8c) \end{cases}$$

solving Eq. (8A) and assuming that $\eta_\mu(0) \neq 0$ for generality, we arrive at $$E_\mu(t) - E_\mu(0) = \chi_{\mu J} F_{mx} [\eta_\mu(t) - \eta_\mu(0)] \quad 0 \leq t < t_f/2 \qquad (9)$$

Because the period of oscillation of $\eta_\mu$ is $\tau_\mu$, Eq. (9) states that if the force $F_{mx}$ acts for a complete number of oscillations (that is, $\eta \tau_\mu$ period), then $\eta_\mu(\eta \tau_\mu) = \eta_\mu(0)$ [whether $\eta_\mu(0)$ equals zero of not], and therefore the energy input to the mode will be zero. On the other hand, if $F_{mx}$ acts for $(n-\frac{1}{2})\tau_\mu$ seconds, then, according to Eq. (3) where $\eta_\mu(0) = 0 = \dot{\eta}_\mu(0)$, $\eta_\mu = 2\eta_{\mu s}$ at $t = (n-\frac{1}{2})\tau_\mu$, and so the energy input to the mode will be $$E_\mu = 2\chi_{\mu J} F_{mx} \eta_{\mu s} = 2\eta_{\mu s}^2 \omega_\mu^2 \frac{1}{2}(2\eta_{\mu s})^2 \omega_\mu^2 \text{ at}$$
$$t = (n-\frac{1}{2}) t_\mu \qquad (10)$$

The resemblance of this energy discussion with the previous amplitude discussion should now be apparent, so further discussion along these lines seems unessential.

The above observations bring forth the fact that the bang-bang torque profile does not always lead to excessive residual modal energy. Indeed, for a space structure if only one low-frequency mode is particularly excitable while others are high-frequency modes, and if half-slew time given by Eq. (2) is an integer times the period of that particular mode, then, as we saw above, the residual energy in that mode after the slew is zero. Such favorable circumstances are of course rare; the half-slew time dictated by maneuver requirement [Eq. (2)] will usually conflict with zero residual energy requirement $t_f/2 = n\tau_\mu (n=1,2,3 \ldots)$ for a low-frequency particularly troublesome mode. Thus a need for freeing the half-slew time is evident.

In the zero residual modal energy example above, we found that $\eta_\mu(t)$ is antisymmetric and $\dot{\eta}_\mu(t)$ symmetric about $t = t_f/2$. Extrapolating this property, $\ddot{\eta}_\mu(t)$ will clearly be antisymmetric, which is true because the bang-bang torque profile is also antisymmetric about $t = t_f/2$. Now, an unthrotteable reaction jet control system can produce only $\pm F_{mx}$ forces, so the changes that may be introduced in the rigid bang-bang torque profile in order to free $t_f/2$ must be $\pm T_{mx}$ pulses antisymmetric about the new $t_f/2$ (new because these pulses will alter the original $t_f$). Also, if we desire only one mode to have zero residual energy at the end of slew, then the half-slew time should be conferred upon only one-parameter freedom. This heuristic argument leads to an antisymmetric torque profile shown in FIG. 1 that has a free parameter to adjust $t_f$ and has two narrow pulses each of width $\sigma t_f/2$ around $t_f/2$. Of course, now the slew time $t_f$ is not governed by Eq. (2); a new equation must be developed instead. Not surprisingly, Singh et al arrived at the same torque profile by applying Pontryagin's maximum principle. As the number of modes which must have zero residual energy increases, an equal number of free parameters governing the width of antisymmetric pulses two per mode around half-slew time are inserted.

BRIEF DESCRIPTION OF THE DRAWINGS

For a clearer understanding of the nature and objects of this invention, reference should now be made to the following detailed specification and to the accompanying drawings in which:

FIG. 3 illustrates a generic deformable spacecraft to be slewed about it X axis.

FIG. 3a is a table showing the first five vehicle modes of the spacecraft shown in FIG. 3.

FIG. 11 is a table of Modal Ampllitude of residual oscillations under four different circumstances.

DESCRIPTION OF THE PREFERRED EMBODIMENT

Figure 1:
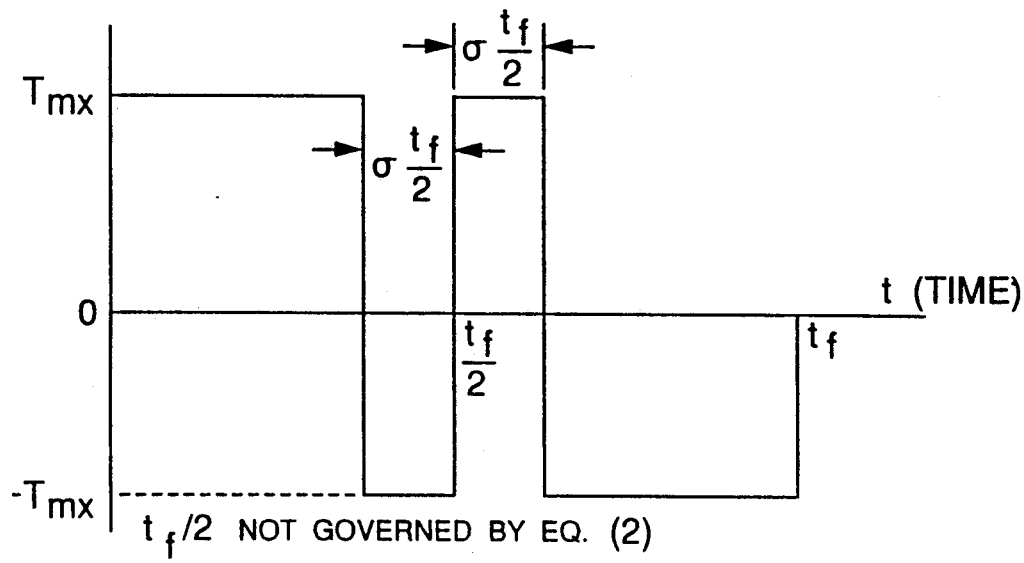
FIG. 1 is a bang bang torque profile with one free parameter for zero residual energy in an undamped flexible mode.

The antisymmetric equi-width intervening torque pulses shown in FIG. 1 are for undamped structure. A torque profile with unequal pulses around $t_f/2$ is shown in FIG. 2a for damped structure. In FIG. 2a the torque changes its signs at $t_1$, $t_2$ and $t_3$ in order for one mode to have zero energy at the end of slew. We will first explain heuristically how this may occur. The initial step torque $T_{mx}$ for $0 < t < t_1$ will excite a damped modal coordinate $\eta_\mu$ as shown in FIG. 2b. The initial amplitude $\eta_{\mu s}$ of modal oscillations around the static deformation, also $\eta_{\mu s}$, will decay within the two amplitude envelopes shown in FIG. 2b. At $\dot{s} = t_1$, the amplitude of oscillation around the static $\eta_{\mu s}$ will be $\eta_{\eta s} \zeta^{Z\mu} \omega_{\mu t}$, and, in contrast to the earlier undamped case, during the interval $0 < t < t_1$, not once the energy of this mode is zero (because for that to happen, both $\eta_\mu$ and $\dot{\eta}_\mu$ must be zero simultaneously). This indicates that, unlike the undamped case, there is no way to terminate $T_{mx}$ at a special moment and yet have zero residual energy in the mode. For the slew to complete, $T_{mx}$ is of course not to be terminated, but reversed to $-T_{mx}$ for which the static deformation is $-\eta_{\mu s}$. Moreover, to satisfy the requirement of zero modal energy at $t=t_f$, the oscillation of the mode at $t=t_f$ must have the amplitude $\eta_{\mu s}$ and such phase that this dynamic amplitude just overcomes the static deformation, and the desired conditions $\eta_\mu(t_f)=0=\dot\eta_\mu(t_f)$ are acquired. Working backwards from $t_f$ then (reminiscent of optimal control), the amplitude envelopes for $t_3 < t < t_f$ will be those shown in FIG. 2b. It is perhaps startling (but true) to observe that the amplitude of oscillation at $t_3$ over and above the static deformation $-\eta_{\mu s}$ is $\eta_{\mu s}\zeta + Z\mu\omega\mu(t_f-t_3)$ which is greater than $\eta_{\mu s}$, implying that extra energy must be added to the structure during $t_1 \leq t \leq t_3$ in order to compensate for energy dissipated during the slew and to acquire the desired dynamic amplitude $\eta_{\mu s}$ at $t=t_f$. The precise determination of the three switching instants $t_1$, $t_2$, $t_3$ and the slew time $t_f$ is what we do next.

DETERMINATION OF INTERVENING PULSE WIDTHS AND SLEW TIME

The following anaylsis is for a single-axis rest-to-rest slew, that is, $$\theta(\theta)=\theta_i, \dot\theta(\theta)=\theta, \theta(t_f)=\theta_f, \dot\theta(t_f)=0 \quad (11a)$$

with zero residual energy in only one $\mu$-th elastic mode:

$$\eta_\mu(t_f)=0=\dot\eta_\mu(t_f) \quad (11b)$$

For the torque profile shown in FIG. 2a, the widths of the two intervening pulses are:

$$\xi_1 \triangleq \sigma_1 t_f/2 \quad \xi_2 \triangleq \sigma_2 t_f/2 \quad (12)$$

Figure 2:
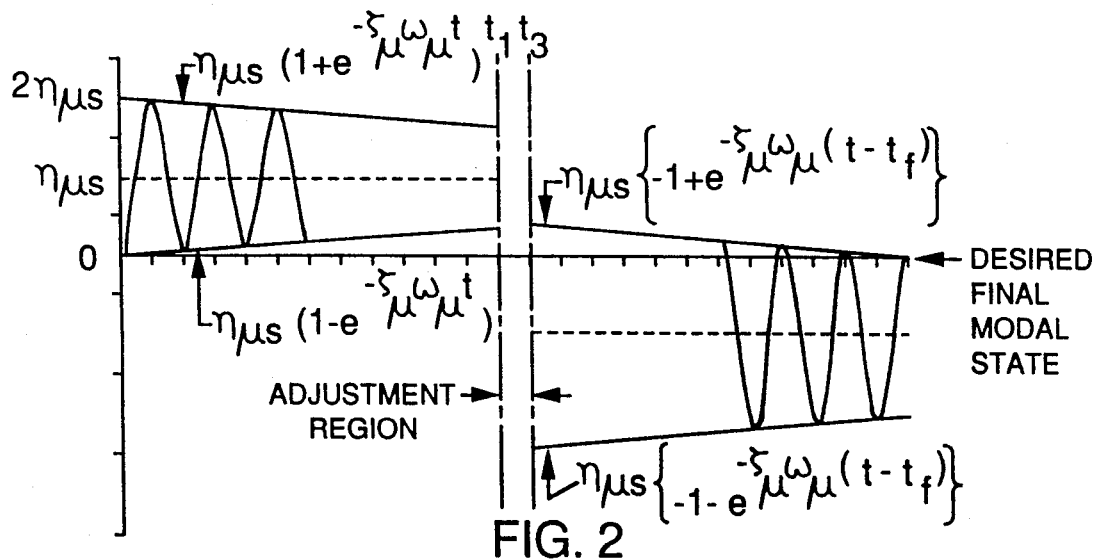
FIG. 2 is the torque profile of a zero-residual-energy minimum-time slew of a flexible space structure with damping.
Figure 2A:
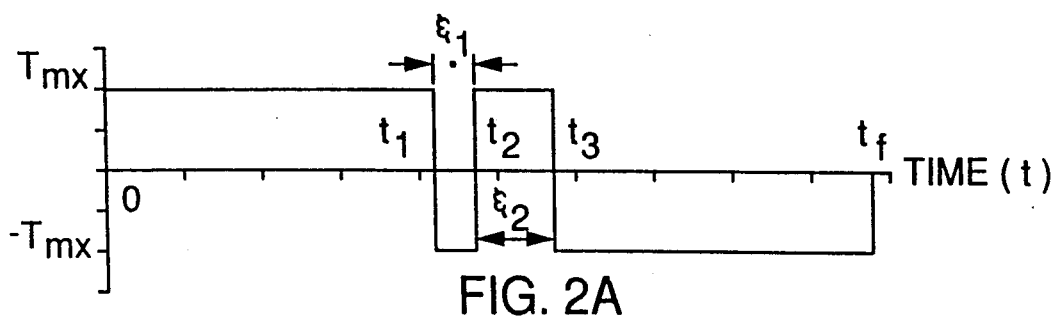
FIG. 2A show the amplitude envelopes of a modal coordinate whose energy at the end of a slew is zero.

In FIG. 2 and in the forthcoming analysis, although $T_x > 0$, the slew requirements may dictate $T_{mx} < 0$, and then $-T_{mx}$ will be $> 0$; the same applies to $\eta_{\mu s}$. Moreover, the right sides of Eqs. (1), which pertain to the conventional bang-bang torque profile is altered to suit the torque profile in FIG. 2a. Therefore we have $$I\ddot\theta \begin{cases} T_{mx} & 0 \leq t \leq t_1, t_2 \leq t \leq t_3 \\ -T_{mx} & t_1 \leq t \leq t_2, t_3 \leq t \leq t_f \\ 0 & t_f \leq t \end{cases} \quad (13a)$$

$$\ddot\eta_\mu + 2\zeta_\mu \omega_\mu \dot\eta_\mu + \omega_\mu^2 \eta_\mu = \quad (13b)$$

$$\begin{cases} \chi_\mu J F_{mx} & 0 \leq t \leq t_1, t_2 \leq t \leq t_3 \\ -\chi_\mu J F_{mx} & t_1 \leq t \leq t_2, t_3 \leq t \leq t_f \\ 0 & t_f \leq t \end{cases}$$

In order to satisfy the requirement of zero slew rate at $t=t_f$, namely, $\dot\theta(t_f)=0$, the solution of Eqs. (13a) yields $$t_1 = t_f/2 - \xi_2 \quad (14a)$$

$$t_3 = t_f/2 - \xi_1 \quad (14b)$$

Next, to satisfy the requirement of slewing the spacecraft by $(\theta_f - \theta_i)$ in the duration $t_f$, Eqs. ((13a) leads to $$\theta_f - \theta_i = \alpha(t_f/2)^2 (1 - 2\alpha_1\alpha_2), \alpha \triangleq T_{mx}/I \quad (14c)$$

where $\alpha$ is the spacecraft's angular acceleration during $0 < t < t_1$ and $t_2 < t < t_3$. In solving Eq. (13b) we assume that the damping coefficient $\zeta_\mu$ is so small that the damped frequency $\omega_{\mu d}=\omega_\mu \sqrt{1-\zeta_\mu^2}$ is the same as the undamped frequency $\omega_\mu$, and in the response equation the terms multiplied with $\zeta_\mu$ are negligible compared to those which are not multiplied with. These two safe assumptions allow us to write the solution of the first of Eqs. (13b) with the initial conditions $\eta_\mu=0=\dot\eta_\mu$ $$\left. \begin{aligned} \eta_\mu(t) &= \eta_{\mu s}(1 - e^{-\zeta_\mu\omega_\mu t} \cos \omega_\mu t) \\ \dot\eta_\mu(t) &= \omega_\mu \eta_{\mu s} e^{-\zeta_\mu\omega_\mu t} \sin \omega_\mu t \end{aligned} \right\} \quad 0 \leq t \leq t_1 \quad (15)$$

the modal state at $t=t_1$ is of especial interest, so we introduce the notations $$c_1 \triangleq \cos \omega_\mu t_1, \; s_1 \triangleq \sin \omega_\mu t_1, \; e_1 \triangleq e^{-\zeta_\mu\omega_\mu t_1} \quad (16)$$

With the aid of Eqs. (15) and the definitions (16) we obtain, at $t=t_1$, $$\eta_{\mu 1} \triangleq \eta_\mu(t_1) = \eta_{\mu s}(1 - e_1 c_1); \; \dot\eta_{\mu 1} \triangleq \dot\eta_\mu(t_1) = \omega_\mu \eta_{\mu s} e_1 s_1 \quad (17)$$

Usually the duration $t_1 < t < t_3$ is small (less than one modal period $\tau_\mu$) for damping to be influential on the modal dynamics, so the damping coefficient $\tau_\mu$ will be ignored in this duration. Starting with the initial conditions $\eta_\mu$, $\dot\eta_{\mu 1}$ given by Eqs. (17), the solution of Eq. (13b) in the range $t_1 < t < t_2$ yields this modal state at $t=t_2$:

$$\eta_{\mu 2} \triangleq \eta_\mu(t_2) = \eta_{\mu s}(2 \cos \omega_\mu \xi_1 - e_1 \cos \omega_\mu t_2 - 1)$$

$$\dot\eta_{\mu 2} \triangleq \dot\eta_\mu(t_2) = \omega_\mu \eta_{\mu s}(-2 \sin \omega_\mu \xi_1 - e_1 \sin \omega_\mu t_2) \quad (18)$$

Likewise, starting with the initial conditions (18), the modal state at $t=t_3$ is found to be $$\eta_{\mu 3} \triangleq \eta_\mu(t_3) = \eta_{\mu s} [2 \cos \omega_\mu(\xi_1+\xi_2) - e_1 \cos \omega_\mu t_3 - 2 \cos \omega_\mu \xi_2 + 1]$$

$$\dot\eta_{\mu 3} \triangleq \dot\eta_\mu(t_3) = \omega_\mu \eta_{\mu s} [-2 \sin \omega_\mu(\xi_1+\xi_2) + e_1 \sin \omega_\mu t_3 + 2 \sin \omega_\mu \xi_2] \quad (19)$$

Now consider the range $t_3 < t < t_f$ in which the damping is of course important. Also, insofar as damping is concerned, it is safe to assume that $$e^{-\zeta_\mu\omega_\mu t_1} = e^{-\zeta_\mu\omega_\mu t_f/2};$$
$$e^{-\zeta_\mu\omega_\mu(t-t_3)} = e^{-\zeta_\mu\omega_\mu(t-t_f/2)} \quad (20)$$

With this simplification and those stated just before deriving the modal response (15), the modal state $\eta_\mu(t)$ and $\dot\eta_\mu(t)$ during $t_3 < t < t_f$ is determined by integrating Eq. (13b) with the applicable right side and by using the state (19) as the initial conditions. On this modal response we impose the zero residual energy requirement (11b). These two conditions then emerge;

$$2\sqrt{e_f} \{\cos \omega_\mu (t_f/2 - \xi_2) - \cos \omega_\mu (t_f/2 + \xi_2 - \xi_1) + \cos \omega_\mu(t_f/2 - \xi_1)\} - e_f \cos \omega_\mu t_f = 1 \quad (21)$$

$$2\sqrt{e_f} \{-\sin \omega_\mu (t_f/2 - \xi_2) - \sin \omega_\mu (t_f/2 + \xi_2 - \xi_1) + \sin \omega_\mu(t_f/2 - \xi_1)\} + e_f \sin \omega_\mu t_f = 0$$

where Eqs. (14) have been called upon, and $$e_f \triangleq e^{-\zeta_\mu \omega_\mu t_f} \quad \sqrt{e_f} = e^{-\zeta_\mu \omega_\mu t_f/2} \qquad (22)$$

The first condition in Eqs. (21) ensures that the dynamic amplitude $\eta_{\mu s}$ just overcome the static deformation $-\eta_{\mu s}$ so that $\eta_\mu(t_f)$ be zero, and the second condition guarantees that the modal rate at that instant is zero; consequently, as $-F_{mx}$ turns off at $t=t_f$, the static deformation $-\eta_{\mu s}$ disappears and the structure carries over for all $t<t_f$ its momentary motionless state at $t=t_f$, as desired.

In order to evaluate the unknowns, $\xi_1$, $\xi_2$, and $t_f$, the in-quadrature conditions (21) must be simplified by separating $t_f$ from $\xi_1$ and $\xi_2$. For this, we multipy Eq. (21b) with $i$ ($i^2 = -1$), add it to ( and the next time, subtract it from) Eq. (21a), and divide throughout by $\sqrt{e_f}e^{-i\omega_\mu t_f/2}$. For compactness, we introduce the notations.

$$c \triangleq \cos(\omega_\mu t_f/2),\; s \triangleq \sin(\omega_\mu t_f/2),\; \mathrm{cn} \triangleq \cosh(\zeta_\mu \omega_\mu t_f/2),\; \mathrm{sh} \triangleq \sinh(\zeta_\mu \omega_\mu t_f/2) \qquad (23)$$

The above manipulations then lead to a pair of complex equations:

$$e^{-i\omega_\mu \xi_2} - e^{+i\omega_\mu(\xi_1-\xi_2)} + e^{i\omega\xi_1} = c\cdot ch + i\, s\cdot sh \qquad (24a)$$

$$e^{i\omega_\mu \xi_2} - e^{-i\omega_\mu(\xi_1-\xi_2)} + e^{-i\omega_\mu \xi_2} = c\cdot ch - is\cdot sh \qquad (24b)$$

where now $\epsilon_1$ and $\epsilon_2$ are on the left sides and $t_f$ on the right. Next, to separate $\xi_1$ from $\xi_2$, we determine $e^{i\omega_\mu \xi_1}$ from (24a) and $e^{i\omega_\mu \xi_1}$ from (24b) in terms of $\xi_2$ and $t_f$. We then multiply $e^{i\omega_\mu \xi_1}$ and $e^{-i\omega_\mu \xi_1}$ together, and with additional algebra arrive at this real equation:

$$(c\cdot ch - 1)\cos\omega_\mu \xi_2 - s\cdot sh \sin\omega_\mu \xi_2 = (sh^2 - s^2)/2 \qquad (25a)$$

which is an exclusive relationship between $\xi_2$ and the half-slew time $t_f/2$. We find analogously the relationship between $\xi_1$ and $t_f/2$:

$$(c\cdot ch - 1)\cos\omega_\mu \xi_1 - s\cdot sh \sin\omega_\mu \xi_1 = (sh^2 - s^2)/2 \qquad (25b)$$

For numerical determination of $\xi_1$ and $\xi_2$ from Eqs. (25) in terms of $t_f/2$, it is helpful to define the amplitude A and phase thus $$A^2 \triangleq (c\cdot ch - 1)^2 + s^2\cdot sh^2,\; \gamma \triangleq \tan^{-1}(c\cdot ch - 1)/(s\cdot sh) \qquad (26)$$

Then Eqs. (25) to simplify to $$A\sin(\omega_\mu \xi_1 - \gamma) = (sh^2 - s^2)/2 = -A\sin(\omega_\mu \xi_2 - \gamma) \qquad (27)$$

The unknown $\xi_1$ therefore will be $$\omega_\mu \xi_1 = \sin^{-1}[(sh^2 - s^2)/2A] - \gamma \qquad (28)$$

Regarding $\xi_2$, Eqs. (27) furnishes its multiple relationships with $\xi_1$, namely, $$\omega_\mu \xi_2 - \gamma = \begin{cases} -\omega_\mu \xi_1 - \gamma, \text{ or} & (29a) \\ \pi - \omega_\mu \xi_2 - \gamma, \text{ or} & (29b) \\ -\pi - \omega_\mu \xi_1 - \gamma, \text{ or} & (29c) \\ \pm 2k\pi - \omega_\mu \xi_1 - \gamma & (29d) \\ (k = 1,2,3 \ldots) \end{cases} \text{(tentative)}$$

To sift the valid relationship from the above four choices, we note that $\xi_1$ and $\xi_2$ both must be greater than zero. On this basis, Eq. (29a) is dismissed readily because it violates that condition. On the same grounds, the minus sign from '±' in Eq. (29d) can be ignored, and the relationship $\omega_\mu \xi_2 = +2k\pi - \omega_\mu \xi_1$ can also be discarded because even for $k=1$ it is not a minimum-time relationship compared to Eq. (29b) and Eq. (29c). For further screening, we not that when $\gamma_\mu = 0$, $\gamma = -\pi/2$ by definition [Eqs. (26)] and $\xi_1 = \xi_2$ according to Eq. (27). Between Eq. (29b) and Eq. (29c), only the former yields $\xi_1 = \xi_2$ for $\zeta_\mu = 0$, the latter does not, so Eq. (29c) is dropped and we finally arrive at $$\omega_\mu \xi_2 = \pi - 2\gamma - \omega_\mu \xi_1 \qquad (30)$$

for the undamped case, $\xi_1 = \xi_2 = \sigma t_f/2$, and Eqs. (27) furnish $$2\sin^2(\omega_\mu \sigma t_f/4) = \sin^2(\omega_\mu t_f/4) \qquad (31a)$$

or $$\cos(\omega_\mu \sigma t_f/2) = \cos^2(\omega_\mu t_f/4) \qquad (31b)$$

SUMMARY OF THE ALGORITHM

The algorithm given below summarizes the steps to determine the quantities $\xi_1$, $\xi_2$ and $t_f$. Note that as the analysis stands, these quantities do not depend on the jet modal coefficients $\chi_{\mu j}$ because the jets producing positive or negative angular accelerations are taken to be located symmetrically around the vehicle mass center.

1. First identify the mode most vulnerable to the slew maneuer. This is usually a low-frequency mode that has both significant translational modal coefficients $\chi_{\mu j}$, Eq. (13b), at the jet locations and significant rotational modal coefficient $\phi_\mu$ contributing to the spacecraft attitude $\theta(t)$, Eq. (1c). Ascertainits its frequency $\omega_\mu$ and the damping coefficient $\zeta_\mu$.

2. Given: the maneuver angle $(\theta_f - \theta_i)$; spacefcraft's central, principal moment of inertia I about the slew axis; slew torque $T_{mx}$; thrust force $F_{mx}$. Ensure that sign $(\theta_f - \theta_i) = \text{sign } T_{mx}$.

3. Assume $\sigma_1 = 0 = \sigma_2$ and so $\xi_1 = 0 = \xi_2$ (eqs. 12), and determine approximate $t_f/2$ from Eq. (14c).

4. For this $t_f/2$, determine the quantities c, s, ch, sh [Eq. (23)] and the amplitude A and phase $\gamma$; then solve Eq. (28) for $\xi_1$ and Eq. (30) for $\xi_2$.

5. Using (12), now determine $\sigma_1$ and $\sigma_2$; substitute these new values in Eq. (14c) and evaluate an improved $t_f/2$.

6. Return to #4 and iterate until $\xi_1$, $\xi_2$ and $t_f/2$ each converge to the true solution within desired accuracy.

IV. NUMERICAL RESULTS AND DISCUSSION

The preceding analysis is now illustrated on a generic spacecraft, shown in FIG. 3, whose elasticity stems from two symmetrically located flexible appendages.

Figure 4:
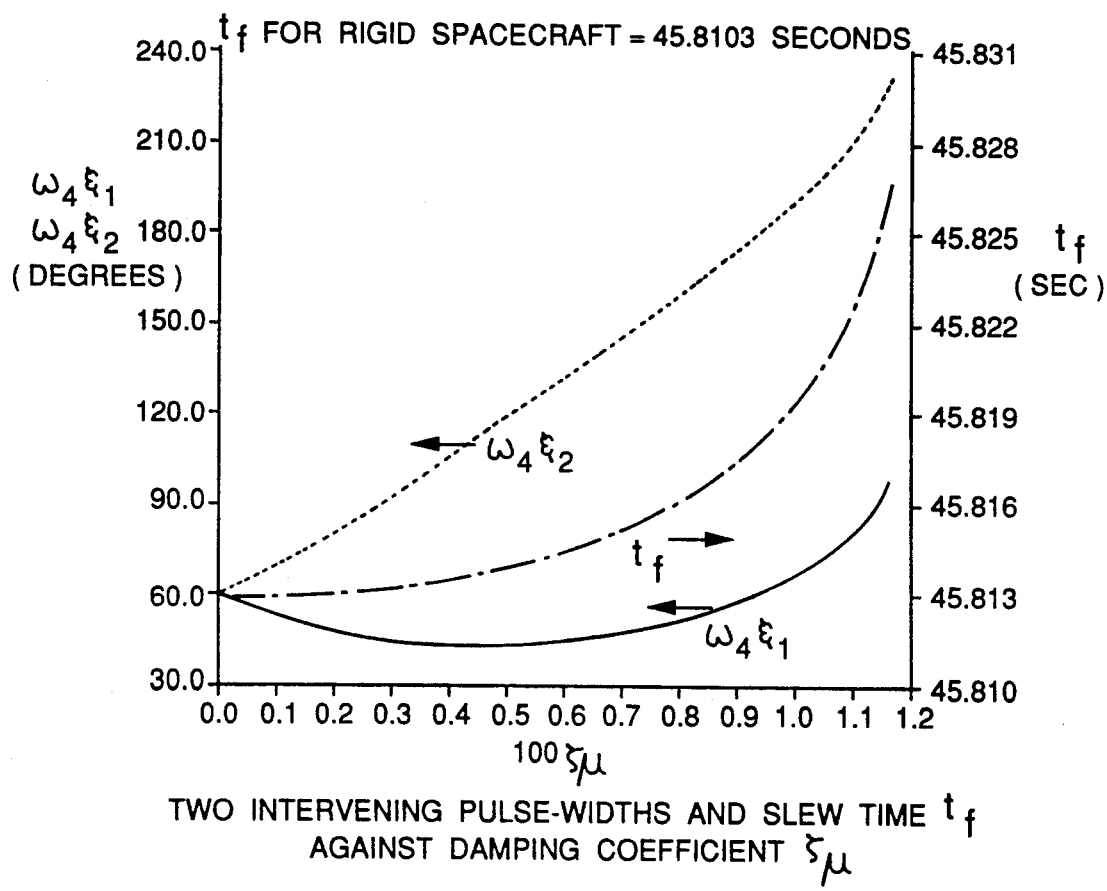
FIG. 4 shows curves of two intervening pulse-widths and slew time $t_f$ against damping coefficient $\zeta_{82}$.
Figure 5:
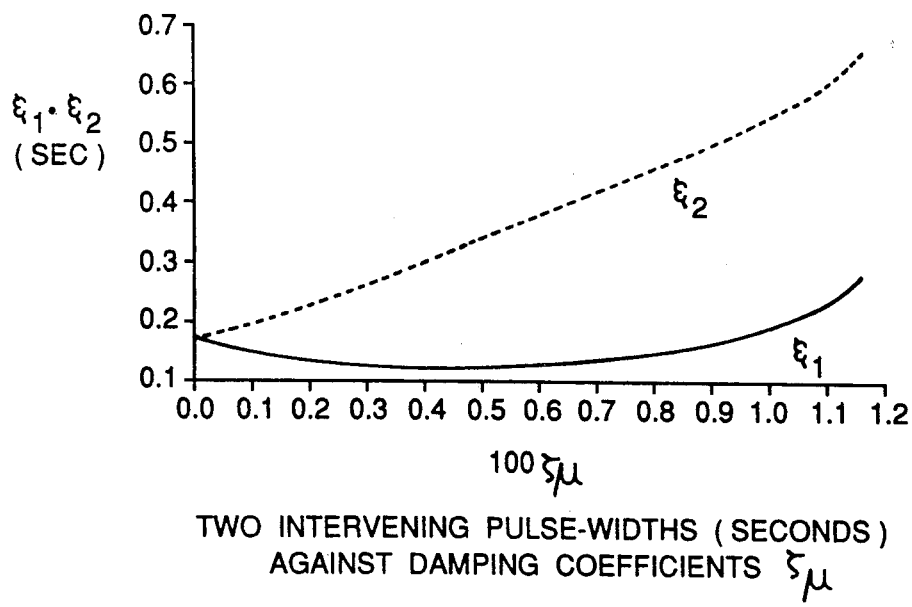
FIG. 5 are curves showing two intervening pulse widths (seconds) against damping coefficients $\zeta_\mu$.

The objective is to slew the spacecraft by 90 degrees about x-axis with the available acceleration $\alpha=0.2994E-2$ rad/s$^2$. The subscript '0' in FIG. 3 connotes the central body $B_0$, but that is irrelevant here. The x-axis interacts with antisymmetric in-plane bending of the arrays, and the first such mode is fourth vehicle mode ($\mu=4$) whose frequency is $\omega_4=6.10235$ rad/sec (0.971 Hz); see Table 1 in FIG. 3a. Of course, if the spacecraft mission objectives dictate a slew about z-axis, which interacts with antisymmetric transverse bending mode and whose fundamental frequency (0.403 Hz) is lower than that of the earlier in-plane bending mode, or a slew about y-axis, which interacts with symmetric transverse bending mode and whose fundamental frequency (0.281 Hz) is still lower than those of the previous two modes, our slew scheme can be applied to these situations as well; but that will not be illustrated here. For $\alpha$ quoted above and $\theta_f-\theta_i=\pi/2$ radians, FIG. 4 illustrates the pulse-width $\omega_4\xi_1$ and $\omega_4\xi_2$ in degrees and the slew time $t_f$ in seconds against the damping coefficient $\zeta_\mu$ in the range $0\leq\zeta_\mu\leq0.0118$. In the companion FIG. 5, the same $\xi_1$ and $\xi_2$ are shown in seconds. As anticipated, when $\zeta_\mu=0$, the two pulse-widths are equal (60 degrees or 170 milliseconds). As damping coefficient increases, the second pulse widens, reaching a maximum of 230 deg (650 ms) at $\zeta_\mu=0.0118$ beyond which (sh$^2=$s$^2$)/2A$>1$ and so Eq. (28) has no solution for the selected $\alpha$ and $(\theta_f-\theta_i)$. The variation in $t_f$ with $\zeta_\mu$ is very small indeed: a total of 16 ms over the range $0\leq\zeta_\mu\leq0.0118$. Because clean jet pulses of as narrow as 20 ms are known to be producible, the jet pulses of the range 120–260 ms (FIG. 5) for the spacecraft in hand to zero the modal residual energy are practical.

Figure 6:
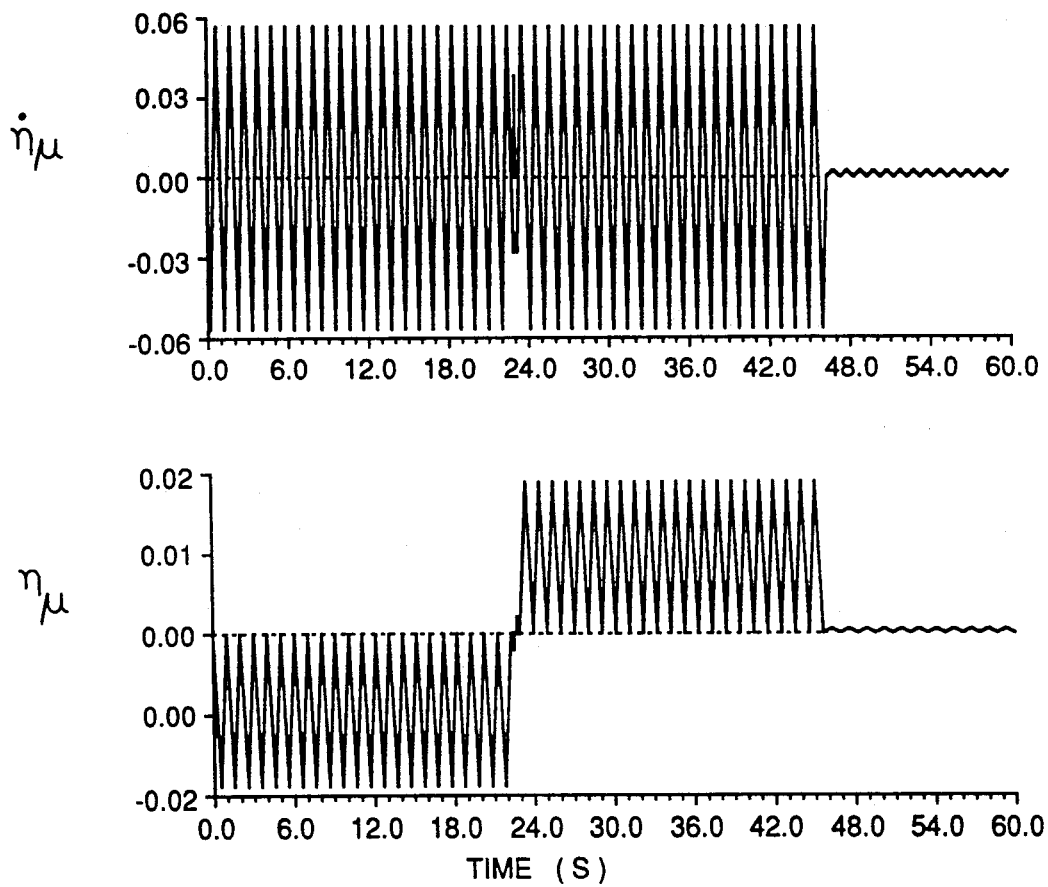
FIG. 6 are curves showing modal coordinates $\eta_\mu$ and it rate $\dot{\eta}_\mu$ with no structural damping, excited by the zero residual energy torque profile based on $\zeta_\mu = 0$.
Figure 7:
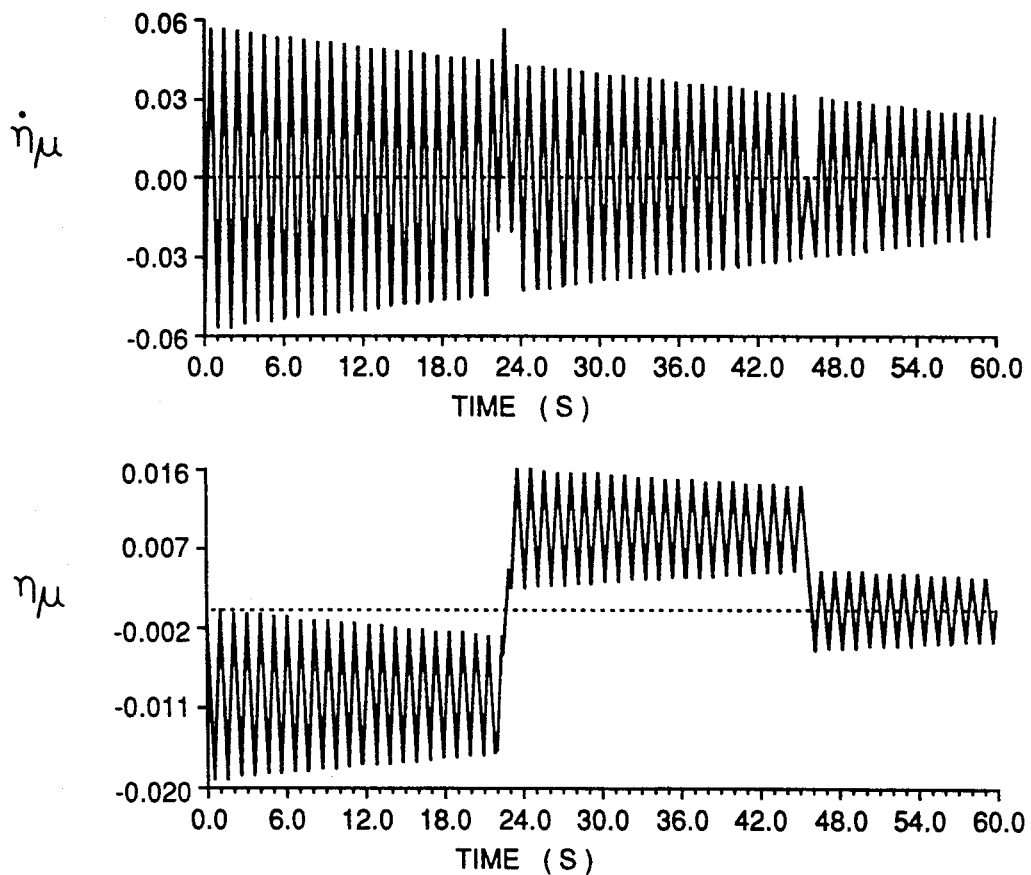
FIG. 7 are additional curves showing modal coordinate $\eta_\mu$ and it rate $\dot{\eta}_\mu$ when $\zeta_\mu = 0.0025$b but the zero-residual energy torque profile is based on $\zeta_\mu = 0$.
Figure 8:
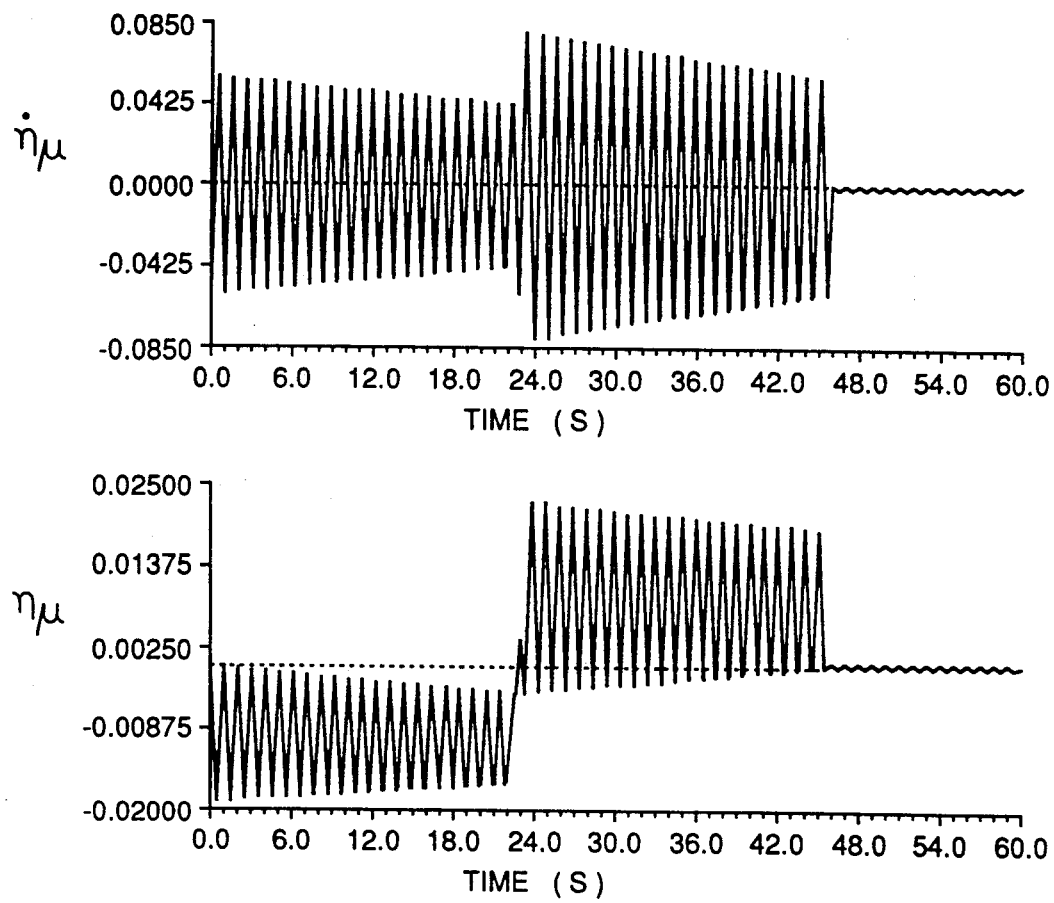
FIG. 8 shows the modal coordinate $\eta_\mu$ and its rate $\dot{\eta}_\mu$ when $\zeta_\mu = 0.0025$ and the zero residual energy torque profile is also based on $\zeta_\mu = 0.0025$.
Figure 9:
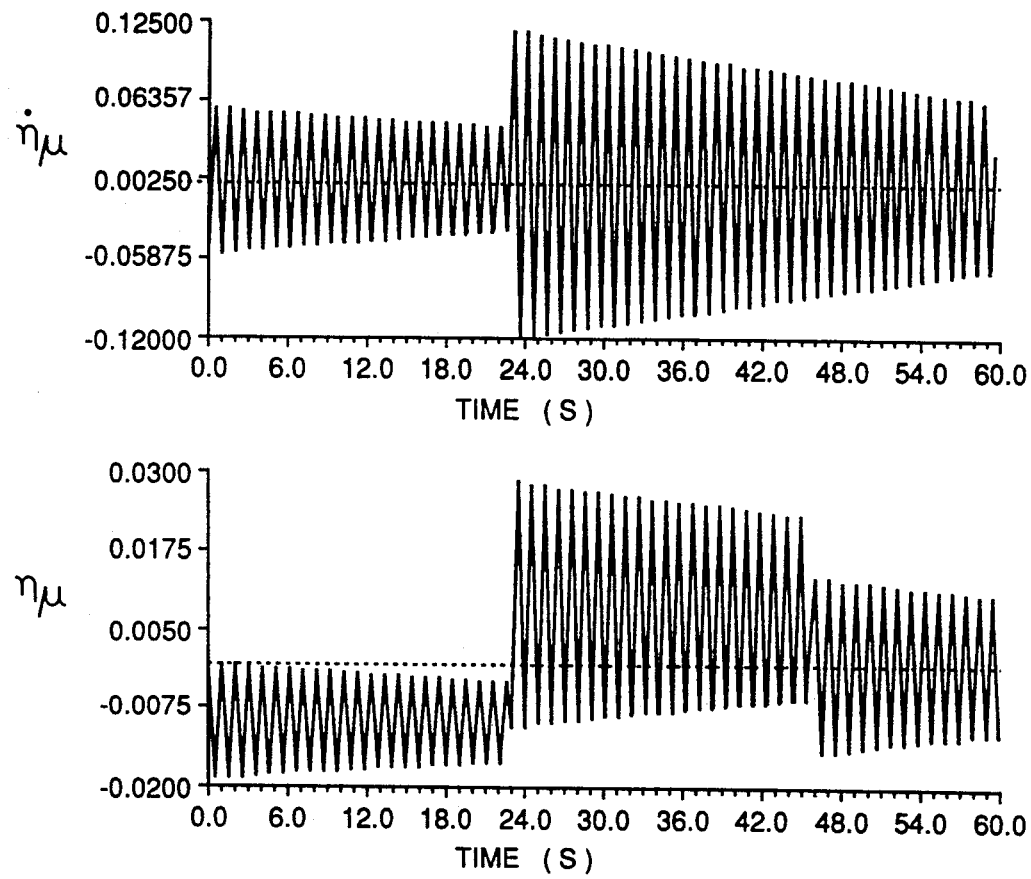
FIG. 9 is curves of the modal coordinate $\eta_\mu$ and its rate $\dot{\eta}_\mu$ and $\zeta_\mu = 0.0025$ and the torque profile is the conventional bang-bang for rigid spacecraft.

We will now illustrate the excitation of the modal coordinate $\eta_\mu(t)$, ($\mu=4$) under four different circumstances. FIG. 6 portrays $\eta_\mu$ and $\dot\eta_\mu$ for undamped mode ($\eta_\mu=0$) excited by the corresponding zero-residual-energy slew torque profile which has two intervening pulses as shown in FIG. 4 for $\eta_\mu=0$. In line with the discussion in the text, $\eta_\mu(t)$ is antisymmetric while $\dot\eta_\mu(t)$ symmetric about $t=t_f/2$ ($t_f$ for $\zeta_\mu=0$; see FIG. 4). This result is analogous to that by Singh et al., but here the analysis and the FORTRAN program are orders of magnitude simpler. The modal states $\eta_\mu$ and $\dot\eta_\mu$ for $t\geq t_f$ are theoretically zero, but this is not achieved in simulation because the critical instants $t_1$, $t_2$, $t_3$, $t_f$(FIG. 2a) are rounded-off to the nearest millisecond, so minute oscillations of the amplitude 0.0004 after $t=t_f$ persist in FIG. 6. Compare this residual amplitude with the maximum $\eta_\mu$, 0.018, during the slew; the residual amplitude is therefore only 2.2% of the maximum $\eta_\mu$. When the same torque profile (the one for $\zeta_\mu=0$) is applied to the spacecraft with $\zeta_\mu=0.0025$, the results shown in FIG. 7 are obtained. The residual oscillations now have the amplitude of 0.0044, compared to the earlier 0.0004 amplitude. These residual oscillations can be minimized (if not annihilated completely) by using the torque profile with intervening pulses corresponding to $\zeta_\mu=0.0025$ (FIG. 4). Such results are shown in FIG. 8 where the amplitude envelopes of $\eta_\mu$ appear as hypothesized in FIG. 2a, and the residual amplitude of $\eta_\mu$ at $t=t_f$ is found to be 0.00025. Lastly, in order to lend prominence to the efficacy of this zero-residual-energy torque profile, FIG. 9 illustrates $\eta_\mu$ and $\dot\eta_\mu$ if the spacecraft were slewed by the conventional bang-bang torque profile ($\xi_1=0=\xi_2$). The residual modal amplitude at $t=t_f$ is found to be 0.0135 compared to the previous modal amplitude of 0.00025. To highlight the contrast among the four cases just discussed, the corresponding residual amplitudes are summarized in Table 2 shown in FIG. 11.

Figure 10:
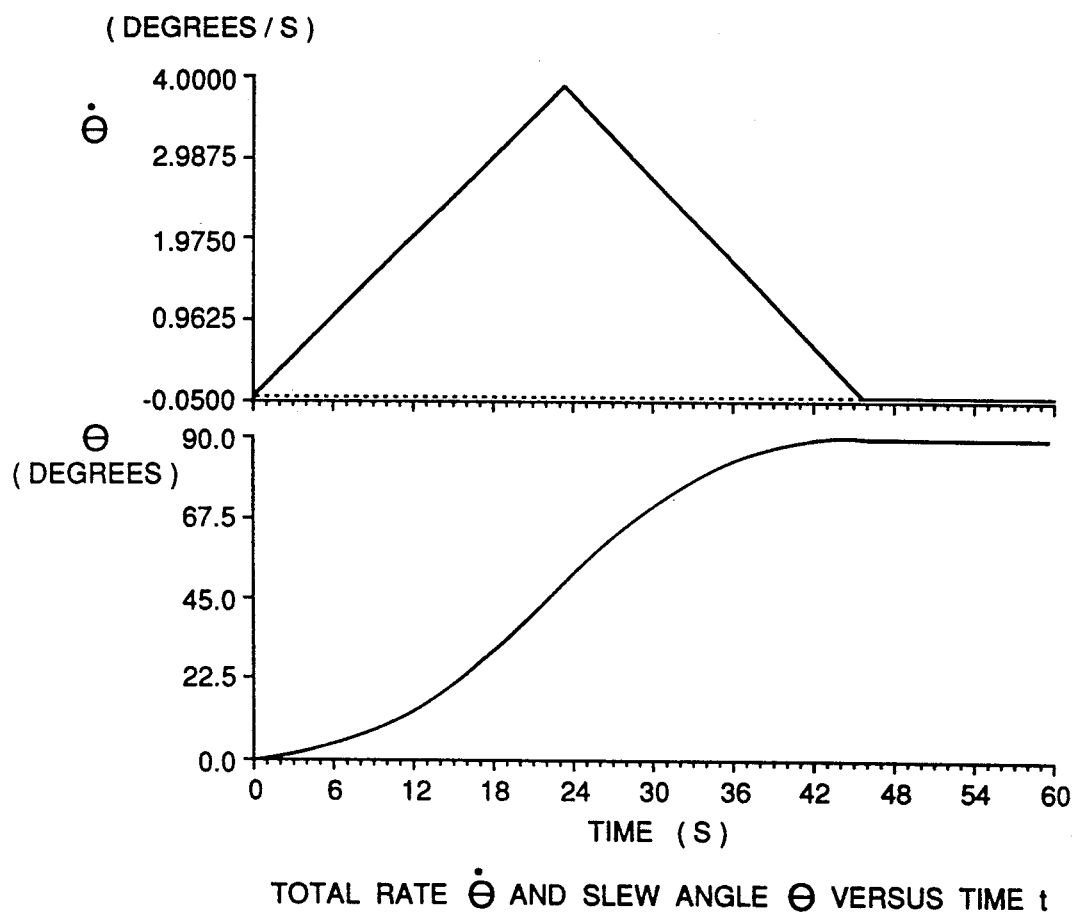
FIG. 10 is curves showing spacecraft attitude and attitude rate.

The spacecraft's total attitude $\theta(t)$, as defined by Eq. (1c), and its rate both driven by the zero-residual-energy torque profile corresponding to $\zeta_\mu=0.0025$ are shown in FIG. 10. While the rigid angle $\theta$ at $t=t_f$ is ninety degrees and the rate zero, the total angle and rate are slightly different. To determine this difference, note that $\phi_{\mu\pi}(\eta=4)=-0.328186E-2$. Because $\eta_\mu(t)$ was found to have the amplitude 0.00025 at $t=t_f$, the contribution of this mode to the attitude is $-4.7E-5$ degrees—a negligible error in the final attitude if we ignore the contributions from other modes (which in this particular example are also negligible).

CONCLUSION

Throughout the above analysis to determine the zero-residual-energy minimum-time torque profile for slewing space structures with small inherent damping, several assumptions were invoked. These are collected below, and the topics of further research emanating from them or otherwise are identified:

1. The reaction jets are assumed to be located symmetrically around the vehicle mass center, and they all produce equal force. When this is not so, unequal positive and negative torques are created, the jets are not switched around half-slew time, and the jet modal coefficients for antisymmetric modes may not be equal and opposite. Dynamic analysis of the genre presented above, nevertheless, can be performed in order to account for these complications. Moreover, under these circumstances, the antisymmetry of the torque-profile about half-slew time will disappear.

2. Space structures are taken to be such that there is only one vehicle elastic mode which is particularly excited by the slew maneuver. If more than one mode are significantly excited, the preceding analysis can be extended to include as many intervening pulses and as many free parameters as twice the number of troublesome modes for a damped structure. In the absence of damping, the number of free parameters will equal the number of troublesome modes.

3. Although the analysis addresses only rest-to-rest slew maneuver, it can be generalized to rest-to-slow-spin maneuver. Likewise, one may develop an analogous scheme to bring the flexible spacecraft from an arbitrary attitude and a slow rate to the origin in minimum time with zero residual energy in critical modes (the problem of Vander Velde and He).

4. The antisymmetry of the modal coordinate, symmetry of its rate, and antisymmetry of its acceleration about half-slew time are properties incidental to the rest-to-rest slew maneuver of undamped space structure. These properties disappear when damping is included in the analysis, or when a different sort of slew maneuver or the control problem stated in #3 are considered. Although these properties are useful when the zero-residual-energy problem is cast within the optimal controls framework, they are unimportant in our structural dynamics approach.

5. Our analysis is based on the assumption that the frequency and damping coefficient of the mode whose energy at the end of slew must be zero are known. Usually this is not so, but the proposed slew torque profile can still be implemented real-time as follows. Note that the intervening torque pulses are applied near half-slew time; therefore, if the maneuver angle is so large that half-slew time treating the spacecraft as rigid is greater than five times the approximately known modal period $\tau_\mu$, then the slew is initiated and with $5\tau_\mu$ the frequency of the excited mode is measured precisely by feeding the attitude signal from a gyro to a minimum-rise-time bandpass filter (See Hablini, "Self Balanced Modal Control for Spacecraft Using Thrusters and Adaptive Bandpass Filters", Journal of Guidance, Control and Dynamics, vol. 15, No. 3, May-Jun. 1992, pp. 587-596). Furthermore, and as pointed out in the same article, if the approximate half-slew time is several $\tau_\mu$'s greater than $5\tau_\mu$, the modal damping coefficient also can be calculated by tracking the slowly decaying modal amplitude (reference 12). Having thus determined $\omega_\mu$ and $\zeta_\mu$ of the critical mode, the precise slew time and the widths of the intervening pulses are calculated before the first intervening pulse must occur, and the on-going zero-residual-energy slew maneuver is then successfully completed.

6. The zero-residual-energy torque profile for a damped space structure is not a minimum deformation profile. Indeed, around half slew time the second intervening pulse imparts surplus energy to the structure, which the structure dissipates in the remaining slew time such that at the end it has just enough dynamic energy to overcome its static deformational energy in order to have zero instantaneous total energy. For undamped structures, on the other hand, the zero-residual-energy torque profile is also the minimum-deformation profile.

Many modifications and variations of the present invention are possible in light of the above teachings and it is therefore understood, that within the scope of the inventive concept, the invention may be practiced otherwise than specifically claimed.

What is claimed is:

1. In a system for a flexible spacecraft, said spacecraft having jets applying positive acceleration forces for slewing said spacecraft about its slew-axis over a maneuver angle $\theta_f - \theta_i$, and having a central, principal moment of inertia I about the slew axis, and equal and opposite negative acceleration forces for decelerating said slewing to stop said spacecraft at a given angular position, the method of applying said forces being such that at the end of said slewing there is no energy in the mode that is excited during the slew, said spacecraft having a low-frequency translational modal coefficient $\chi_{\mu j}$, a rotational modal coeffient $\phi_\mu$, a frequency $\omega_\mu$, and a damping coefficient $\zeta$, said method comprising the following steps:

apply a wide pulse of said acceleration forces to said spacecraft for a period of time extending from $t_0$ to $t_1$;

apply a narrow pulse of said deceleration forces to said spacecraft for a period of time extending from $t_1$ to $t_2$;

apply a narrow pulse of said acceleration forces to said spacecraft for a period of time extending from $t_2$ to $t_3$;

apply wide pulse of said deceleration forces to said spacecraft for a period of time extending from $t_3$ to $t_f$;

said periods of time of said narrow and wide pulses being determined in accordance with the following:

Step 1. assume the absence of the narrow pulses, so that the normalized widths $\sigma_1$ and $\sigma_2$ of the narrow pulses, defined as $$\sigma_1 = 2(t_2-t_1)/t_f \quad \sigma_2 = (t_3-T_2)/t_f \tag{1}$$

are zero;

Step 2. determine half slew time ($t_f/2$) using the relationship:

$$\theta_f - \theta_i = (T_{mx}/I)(t_f/2)^2(1 - 2\sigma_1\sigma_2) \tag{2}$$

Step 3. for the determined half slew time, $t_f/2$, calculate the following quantities:

$$c = \cos(\omega_\mu t_f/2), \quad s = \sin(\omega_\mu t_f/2) \tag{3}$$
$$ch = \cosh(\zeta \omega_\mu t_f/2), \quad sh = \sinh(\zeta \omega_\mu t_f/2)$$

Step 4. determine the amplitude A and phase $\gamma$ where:

$$A = \{(c\cdot ch - 1)^2 + s^2 \cdot sh^2\}^{\frac{1}{2}}$$
$$\gamma = \tan^{-1}(c\cdot ch - 1)/(s\cdot sh) \quad (-\pi \leq \gamma \leq \pi) \tag{4}$$

Step 5. determine the quantities $\xi_1$ and $\xi_2$ in accordance with the following relationships:

$$\omega_\mu\xi_1 = \sin^{-1}[(sh^2-s^2)/2A] - \gamma \quad \omega_\mu\xi_2 = \omega_\mu\xi_1 + 2\gamma + \pi \tag{5}$$

where $\xi_1$ and $\xi_2$ are the narrow with of the pulses between t1 and t2, and t2 and t3, respectively;

Step 6. calculate $\xi_1 = (t_2-t_1)$ and $\xi_2 = (t_3-t_2)$.

2. The method of claim 1, and the additional step of calculating more accurate half slew-time using equation 2.

3. The method of claim 2 and repeating step 5 and 6 until $\xi_1$ and $\xi_2$ and $t_f/2$ are determined within a predetermined accuracy.

* * * * *